Figure 3:
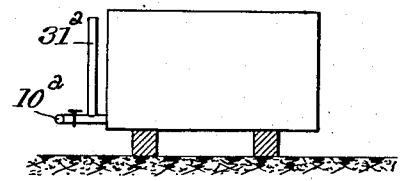

Aug. 12, 1958  M. DELACOMMUNE  2,847,352
PROCESS AND APPARATUS FOR THE PRODUCTION OF MANURE GAS
Filed Oct. 18, 1954  2 Sheets-Sheet 1
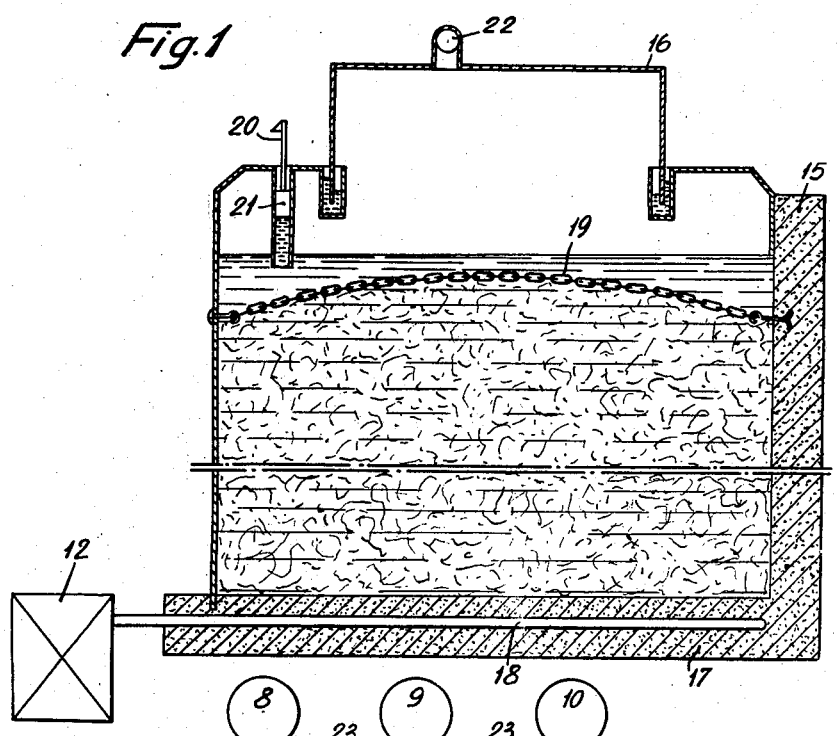
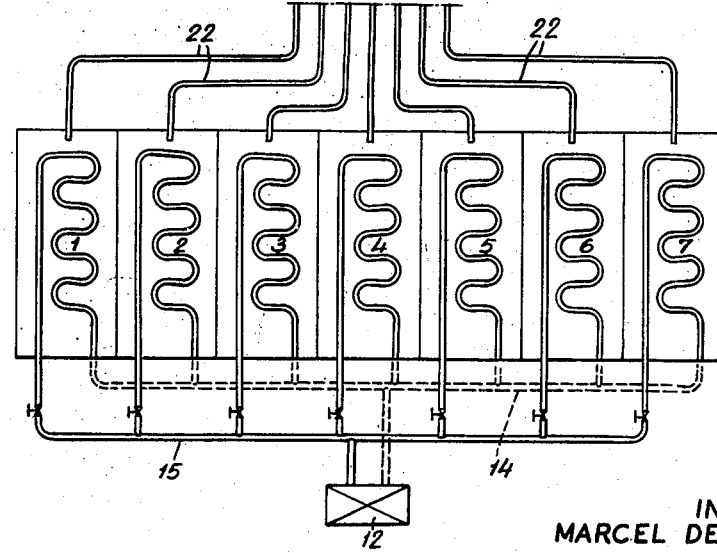
INVENTOR
MARCEL DELACOMMUNE Aug. 12, 1958 M. DELACOMMUNE 2,847,352
PROCESS AND APPARATUS FOR THE PRODUCTION OF MANURE GAS
Filed Oct. 18, 1954 2 Sheets-Sheet 2

INVENTOR
MARCEL DELACOMMUNE
BY
Wenderoth, Lind & Ponack
Attys.

United States Patent Office 2,847,352
Patented Aug. 12, 1958

2,847,352

PROCESS AND APPARATUS FOR THE PRODUCTION OF MANURE GAS

Marcel Delacommune, Godewaersvelde, France, assignor to Societe Anonyme Immobiliere Canadienne Francaise, Godewaersvelde, France, a French company Application October 18, 1954, Serial No. 462,983

Claims priority, application France October 29, 1953

4 Claims. (Cl. 195—143)

Many processes and apparatus have already been proposed for the manufacture of manure gas, which consists, as is well known, of a mixture containing principally methane, hydrogen and carbonic acid gas, but they have not hitherto found any general application despite the needs of agriculture, because of their irregularities in operation and of their insufficient output. With such apparatus, a considerable production of gas is generally observed during the second and third weeks, followed by a rapid reduction, and in addition despite certain heat-insulating precautions and heating either in the mass or in the side walls, substantial variations in the rate of production in accordance with the external temperature are observed.

The present invention has for its object to provide a process and an apparatus designed to obviate these disadvantages.

Considered from a first aspect, the said invention resides in maintaining the solid manure immersed in the liquid manure throughout the duration of its fermentation. In the research which led up to the present invention, it has been observed that the solid particles in suspension, which tend to rise in the liquid and to float on the surface after a certain period of fermentation, lie above the level of this liquid and that the activity of the fermentation then rapidly decreases.

In accordance with the invention, the fermentation tanks comprise means for systematically preventing the solid materials from floating on the surface. Thus, since all the solid material is immersed in the liquid, the transmission of heat takes place regularly throughout the mass and the temperature remains uniform.

These means may consist of chains or bars of sufficient weight and strength which form in the upper part of the tank a system through which the solid manure cannot pass in the course of its fermentation. A horizontal partition of any desired form may also be provided, or if a loss of a certain percentage of output is accepted the top of the tank may even be utilised for this purpose, the level of the liquid then rising as closely as possible to this top or partition.

In addition, the installation will preferably comprise a gauge to enable the height of the liquid in the tank to be determined at any instant, as also means for compensating for the fall in the level of the liquid and for restoring this level to the desired height in order that all the solid material may be immersed.

More particularly, in order to maintain this level at the required height, communications may be provided between the tanks in order to pass the liquid from one tank in which the level is too high into another tank in which it is not so high.

Experiments have shown, in fact, that for a given tank the level of the liquid manure rises when the production curve is rising and falls when the said curve falls.

This is explained by the fact that the gas bubbles forming have a constantly increasing volume in the period of increasing production and constantly decreasing volume in the period of decreasing production. It is hence necessary to withdraw liquid manure from the tanks during the first month of production and to return it during the second month.

Consequently, in accordance with one of the embodiments of the invention, communications are established between the tanks in such manner that the tank in which the liquid level is too high transfers liquid into those which are at the end of production and therefore require it.

Preferably, the battery of tanks will be provided with a system of pipes to enable the principle of communicating vessels to take effect, shut-off valves being provided to enable one or more of them to be cut off.

With a view to ensuring an equal temperature throughout the liquid mass containing the solid material in suspension, the installation comprises particular heating means known per se, which have here given far better results than any others employed, namely the heating of the bottom of the tanks by coils or the like ensuring substantially equal distribution of the heat throughout the liquid in these tanks.

An apparatus which has given particularly satisfactory results comprises tanks, the base of which consists of a concrete sill in which there are embedded circulation tubes fed with hot water from a special boiler. Naturally, such an arrangement may be completed by a heat insulation of the walls, or even by similar pipes disposed in the mass of the walls. Regulating means are provided to maintain the internal temperature constant despite the external variations or to vary the rate of production by varying this temperature.

In a particular embodiment, the apparatus comprises a series of juxtaposed tanks heated from the bottom as hereinbefore stated, the heating pipes for the bottom of each of the tanks being adapted to be separately placed in and out of circuit, and each of them effecting, by its own heating mass, the heat insulation and even the lateral reheating of the adjacent pipe.

In order that the present description may be more readily understood, the accompanying drawings show diagrammatically:

Figure 1, a diagrammatic view in vertical section of a fermentation tank according to the invention.

Figure 2, a diagrammatic plan view of an installation comprising seven tanks and three gasometers.

Figure 4:
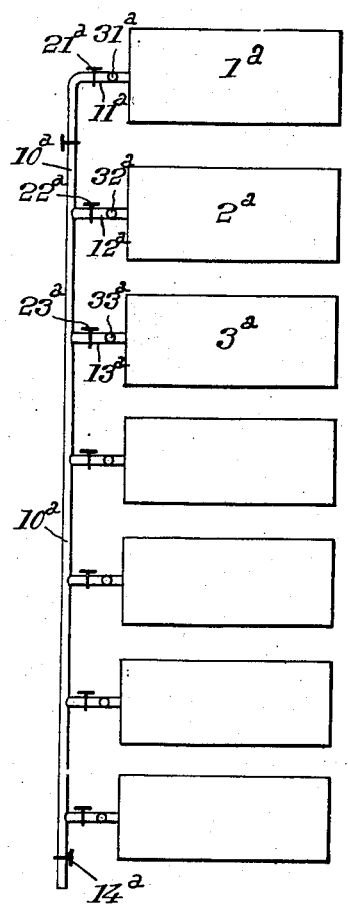

Figures 3 and 4 a sectional view on the line III—III of Figure 4 and a plan view of another embodiment of the invention, respectively.

In the example illustrated in Figure 1, it will be seen that the tank comprises a concrete base 17, in which are embedded heating pipes 18 fed from a boiler 12. In order to maintain the solid materials constantly immersed, the tank comprises at a suitable height transversely extending chains 19.

The installation illustrated in Figure 2 comprises a plurality of tanks 1, 2, 3, 4, 5, 6 and 7, which have a sill 17 consisting of concrete, through which pipes 18 extend, which are connected to a suitable boiler, similar to a central heating boiler. The said boiler may with advantage be heated by means of a part of the gas produced by the installation.

The tank is closed at the top by a bell 16 provided with appropriate means to enable it to be opened for the purpose of charging and emptying. These means, as also the pipes necessary for draining and replacing the liquid manure, do not form part of the invention and therefore have not been illustrated in the drawings.

Each tank comprises a thermometer (not shown) as also a leval gauge consisting, for example, of an eyepiece 20 fixed to a float 21.

The tanks 1, 2 . . . 6, 7 are so juxtaposed that the lateral heat insulation of each of them is effected by the adjacent tanks. The heating pipes 18 in the base of each tank are independent, so that the rate of operation of each tank may be individually regulated. The pipes 22 for the discharge of the gas lead to a distributor 11 consisting of any appropriate combination of shut-off valves or cocks, from which there extend the pipes 23 feeding through the top a battery of gasometers 8, 9, 10, forming a buffer battery with the utilisation system.

The working of the tanks in operation may be combined to provide a substantially constant production.

In the example illustrated in Figures 3 and 4, the tanks 1a, 2a, 3a, etc. are connected together by a common duct 10a and branches 11a, 12a, 13a each comprising a shut-off valve 21a, 22a, 23a, etc. Disposed between each of the tanks and the corresponding shut-off valve is a funnel 31a, 32a, 33a, etc. which enables the level in each tank to be supervised. It is also possible to complete this installation by providing shut-off valves such as 41a in one or more of the sections between the tanks of the common duct, and a draining valve, such as 14a for draining one or more tanks when required.

It will be seen without further explanation that, by virtue of the principle of communicating vessels, it is sufficient to open the appropriate cocks in order to pass liquid from the tanks in which the level is too high to those in which it is too low.

I claim:

1. Apparatus for the fermentation of manure comprising in combination at least one closed fermentation vat having a masonry bottom, heating elements embedded in the said masonry bottom and distributed evenly over substantially the entire area of said bottom, a plurality of lateral side walls on said bottom, a network of manure restraining means removably attached to said lateral walls near the tops thereof at a level beneath a level at which liquid for immersing the manure will be kept, a cover on said vat, and evacuation tubing for the gas produced by fermentation of said manure in said vat positioned above the level at which the immersing liquid will be kept.

2. Apparatus as claimed in claim 1 in which said manure restraining means comprises a plurality of heavy chains.

3. Apparatus as claimed in claim 1 in which said manure restraining means comprise a plurality of heavy bars.

4. Apparatus for the fermentation of manure comprising in combination a plurality of closed fermentation vats each vat having a masonry bottom, heating elements embedded in the said masonry bottom and distributed evenly over substantially the entire area of said bottom, a plurality of lateral side walls on said bottom, a network of manure restraining means removably attached to said later walls near the tops thereof at a level beneath a level at which liquid for immersing the manure will be kept, a cover on said vat, and evacuation tubing for the gas produced by fermentation of said manure in said vat positioned above the level at which the immersing liquid will be kept, and communicating conduits between said vats which are permanently open during the fermentation, whereby the level of liquid in all said vats remains the same and the displacements of liquid are produced without agitation in the vats.

References Cited in the file of this patent

UNITED STATES PATENTS

| | | |
|---|---|---|
| 1,692,446 | Imhoff | Nov. 20, 1928 |
| 1,717,100 | Downes | June 11, 1929 |
| 1,792,450 | Stich | Feb. 10, 1931 |
| 1,803,593 | Clark | June 2, 1931 |
| 1,880,772 | Buswell | Oct. 4, 1932 |
| 1,880,773 | Buswell | Oct. 4, 1932 |
| 2,050,915 | Beddoes et al. | Aug. 11, 1936 |
| 2,228,628 | Hahn | Jan. 14, 1941 |

OTHER REFERENCES

Underkoffler et al.: Industrial Fermentations, vol. II, 1954, Chemical Publ. Co., Inc., New York, pp. 538–545, 551–555.